(12) United States Patent
O'Banion et al.

(10) Patent No.: US 6,267,038 B1
(45) Date of Patent: *Jul. 31, 2001

(54) VARIABLE CUT SCROLL SAW

(75) Inventors: Michael L. O'Banion, Westminster; Frederick R. Bean, Finksburg; Louis M. Shadeck, Timonium; Warren A. Ceroll, Owings Mills, all of MD (US); David A. Porter, Hanover, PA (US); Kendall M. Smith, Eldersburg, MD (US)

(73) Assignee: Black & Decker Inc., Newark, DE (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/020,186

(22) Filed: Feb. 6, 1998

(51) Int. Cl.[7] .................................................... B27B 19/00
(52) U.S. Cl. .................................. 83/781; 83/786; 83/662
(58) Field of Search ........................... 83/781, 816, 581.1, 83/699.21, 747, 776, 779, 785, 786, 782, 783, 811, 812, 820, 778, 571, 640, 625, 626, 647, 651.1, 662

(56) References Cited

U.S. PATENT DOCUMENTS

| | | | |
|---|---|---|---|
| 4,825,741 | * | 5/1989 | Wellington et al. ............... 83/781 |
| 4,841,823 | * | 6/1989 | Brundage ........................... 83/781 |
| 5,228,376 | * | 7/1993 | Huang ................................ 83/781 |
| 5,267,498 | * | 12/1993 | Miyamoto et al. ................. 83/781 |
| 5,303,627 | * | 4/1994 | Shondel ............................. 83/783 |
| 5,351,591 | * | 10/1994 | Miyamoto et al. ................. 83/781 |
| 5,520,081 | * | 5/1996 | Rice et al. ......................... 83/781 |
| 5,768,971 | * | 6/1998 | O'Bannion et al. ............... 83/783 |

FOREIGN PATENT DOCUMENTS

| | | | |
|---|---|---|---|
| 320113 | * | 4/1919 | (DE) ................................... 83/662 |
| 502848 | * | 7/1930 | (DE) ................................... 83/662 |
| 0792711 | | 3/1997 | (EP) . |

* cited by examiner

Primary Examiner—M. Rachuba
(74) Attorney, Agent, or Firm—Adan Ayala

(57) ABSTRACT

A scroll saw including an adjustable tensioning mechanism is disclosed. The saw includes a housing having an inner surface and a pivoting arm having a rearward end disposed within an opening in the housing. A first blade clamp is disposed at the forward end of the pivoting arm and secures the upper end of a saw blade. The lower end of the saw blade is secured in a second blade clamp disposed at the forward end of a lower arm. A wedge is disposed within the housing, in contact with the inner surface of the housing. The wedge also is disposed in contact with and translatable along a surface of the pivoting arm. A rod is linked to the wedge at one end and extends through the pivoting arm. The rod includes an upwardly turned arm. A cam having a spiral track is rotatably mounted at the front of the pivoting arm with the upwardly turned arm disposed in the track. Rotation of the cam causes the track to move along the upwardly turned arm, further causing the rod and wedge to move forwardly, with the contact between the wedge and the inner surface causing the wedge and the rearward end of the pivoting arm to pivot downwardly, and the forward end of the pivoting arm to pivot upwardly to increase the tension of the blade.

25 Claims, 14 Drawing Sheets

VARIABLE CUT SCROLL SAW

FIELD OF THE INVENTION

This invention relates generally to scroll saws and, more particularly, to a scroll saw that can be adjusted from fine to coarse (aggressive) cutting.

BACKGROUND OF THE INVENTION

Most scroll saws are typically of two types: parallel arm scroll saws and one-piece C-arm shaped scroll saws. Parallel arm scroll saws include upper and lower horizontally extending arms which pivot in unison about vertically aligned pivot pins. Examples of such saws are shown in U.S. Pat. Nos. 4,616,541, 4,838,138 and 4,841,823.

C-arm shaped scroll saws connect upper and lower arms in a single C-shaped arm structure which pivots about a pivot point located on the bight end portion of the C-shaped arm structure. Examples of such saws are shown in U.S. Pat. Nos. 4,503,742, 4,625,609 and 4,646,605.

All these saws have vertical, or near vertical, cutting blade paths. These allow for fine cutting, as users demand precision in their cutting. However, this limits the use of the scroll saw to only fine work. In turn, sometimes users want faster, albeit coarser, cuts.

It is an object of this invention to provide a scroll saw that allows both fine and coarse cutting of workpieces, thus providing greater flexibility than prior art scroll saws.

SUMMARY OF THE INVENTION

In accordance with the present invention, an improved scroll saw is employed. The scroll saw includes a frame with a worktable for supporting workpieces, first and second blade clamps for clamping a blade therebetween, an oscillating mechanism disposed within the frame, the oscillating mechanism moving the first and second blade clamps in a direction along a substantially vertical axis, wherein the oscillating mechanism comprises a first arm connected to the first blade clamp and a second arm connected to the second blade clamp. The length of the first arm can be changed so that the blade is shifted to a selected angle from the vertical axis. Preferably, the first arm comprises two sections that can be moved relative to each other in order to change the length of the first arm.

Also disclosed is a saw comprising a rear casting, and first and second arms connected to and forwardly extending from the casting. The first and second arms have respective forward ends for holding a blade. The first arm is pivotably attached to the casting and is pivotable between a first position near the blade and a second position away from the blade. The saw further comprises a workpiece support table disposed between the first and second arms, where the table has a hole through which the blade may extend, and a detent mechanism disposed on the arm for maintaining the arm in the second position. The detent mechanism may include a pin disposed on the arm engaging a notch in the casting.

Further disclosed is a saw comprising a frame with a worktable for supporting workpieces, first and second blade clamps for clamping a blade therebetween, an oscillating mechanism disposed within the frame, the oscillating mechanism moving the first and second blade clamps in a direction along a substantially vertical axis, and a dust collector attached to the underside of the table having a main body forming a substantially enclosed chamber and an exhaust duct connected to the main body. Preferably the dust collector is removably attached to the table.

Also disclosed is a fence for a saw including at least one magnetic block and a fence face attached to the magnetic block. Preferably the fence face is slidably attached to the magnetic block. The magnetic block may comprise an electromagnet.

Further disclosed is a blade clamp for holding a saw blade comprising an arm portion connectable to a saw, a clamping portion extending forwardly from the arm portion, the clamping portion comprising a vertical ledge portion having a smaller width than the width of the saw blade, and a locking portion attached to the arm portion.

Also disclosed is a saw comprising a frame, first and second arms connected to and forwardly extending from the frame and having respective forward ends for holding a blade, and a workpiece support table disposed between the first and second arms, where the table has a hole through which the blade may extend, and a removable table disposed on the table for selectively increasing the size of the hole.

Further disclosed is a magnetic blade holder comprising a magnetic main body and at least one storage cavity disposed on the upper side of the main body. The main body may have a magnet disposed underneath the storage cavity.

Also disclosed is a saw comprising a frame with a worktable for supporting workpieces, first and second blade clamps for clamping a first blade therebetween, an oscillating mechanism disposed within the frame, the oscillating mechanism moving the first and second blade clamps in a direction along a substantially vertical axis, a motor connected to the oscillating mechanism, and a blade holder disposed around the motor for magnetically holding a second blade.

Further disclosed is a saw comprising a frame with a worktable for supporting workpieces, first and second blade clamps for clamping a first blade therebetween, an oscillating mechanism disposed within the frame, the oscillating mechanism moving the first and second blade clamps in a direction along a substantially vertical axis, a motor connected to the oscillating mechanism, and first and second potentiometers connected to the motor for controlling the motor speed. Preferably, the first and second potentiometers are connected in parallel to each other.

Additional features and benefits of the present invention are described, and will be apparent from, the accompanying drawings and the detailed description below.

DESCRIPTION OF THE DRAWINGS

The accompanying drawings illustrate preferred embodiments of the invention according to the practical application of the principles thereof, and in which.

DETAILED DESCRIPTION

Figure 1:
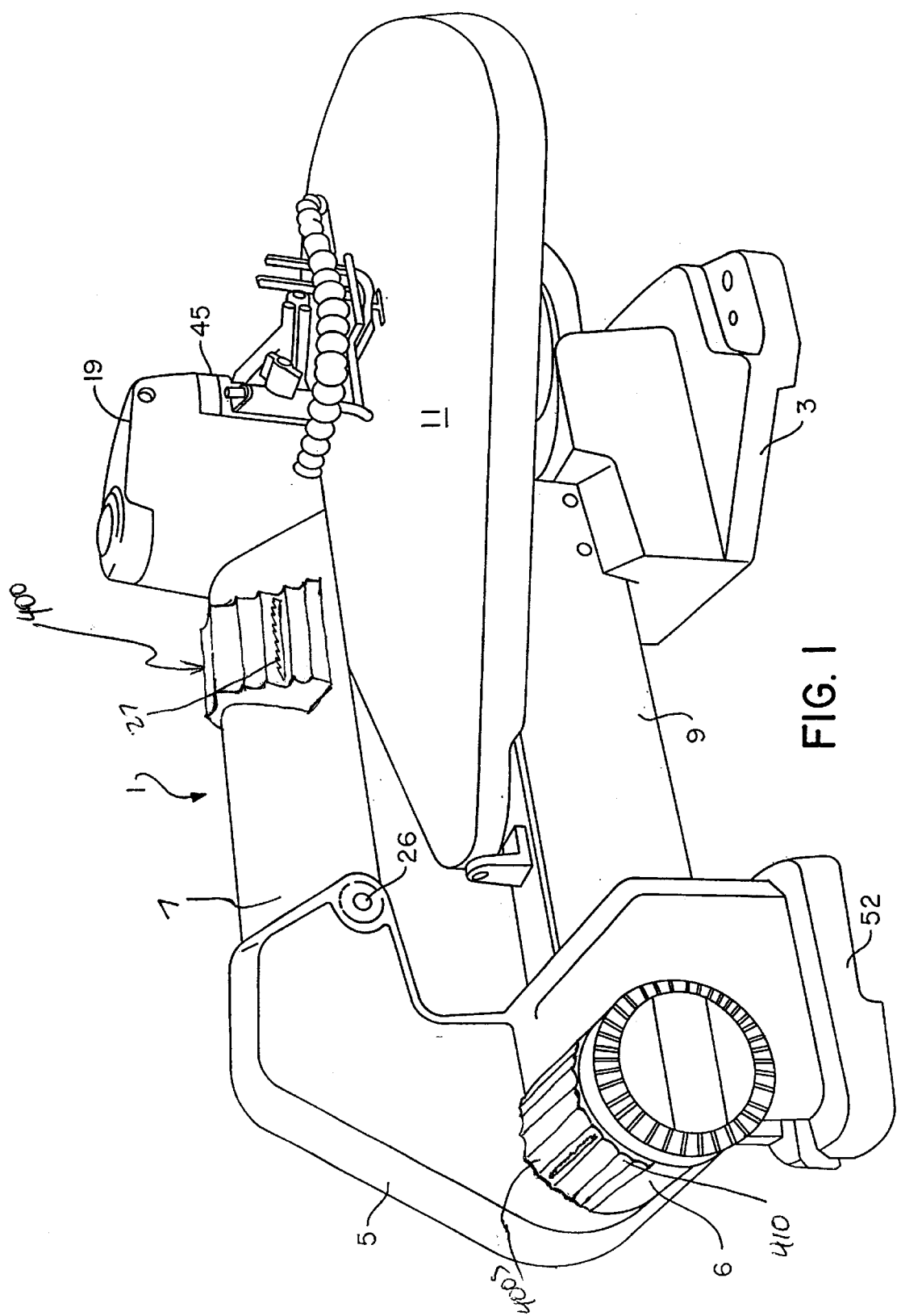
FIG. 1 is a perspective view of a scroll saw according to the present invention.
Figure 2:
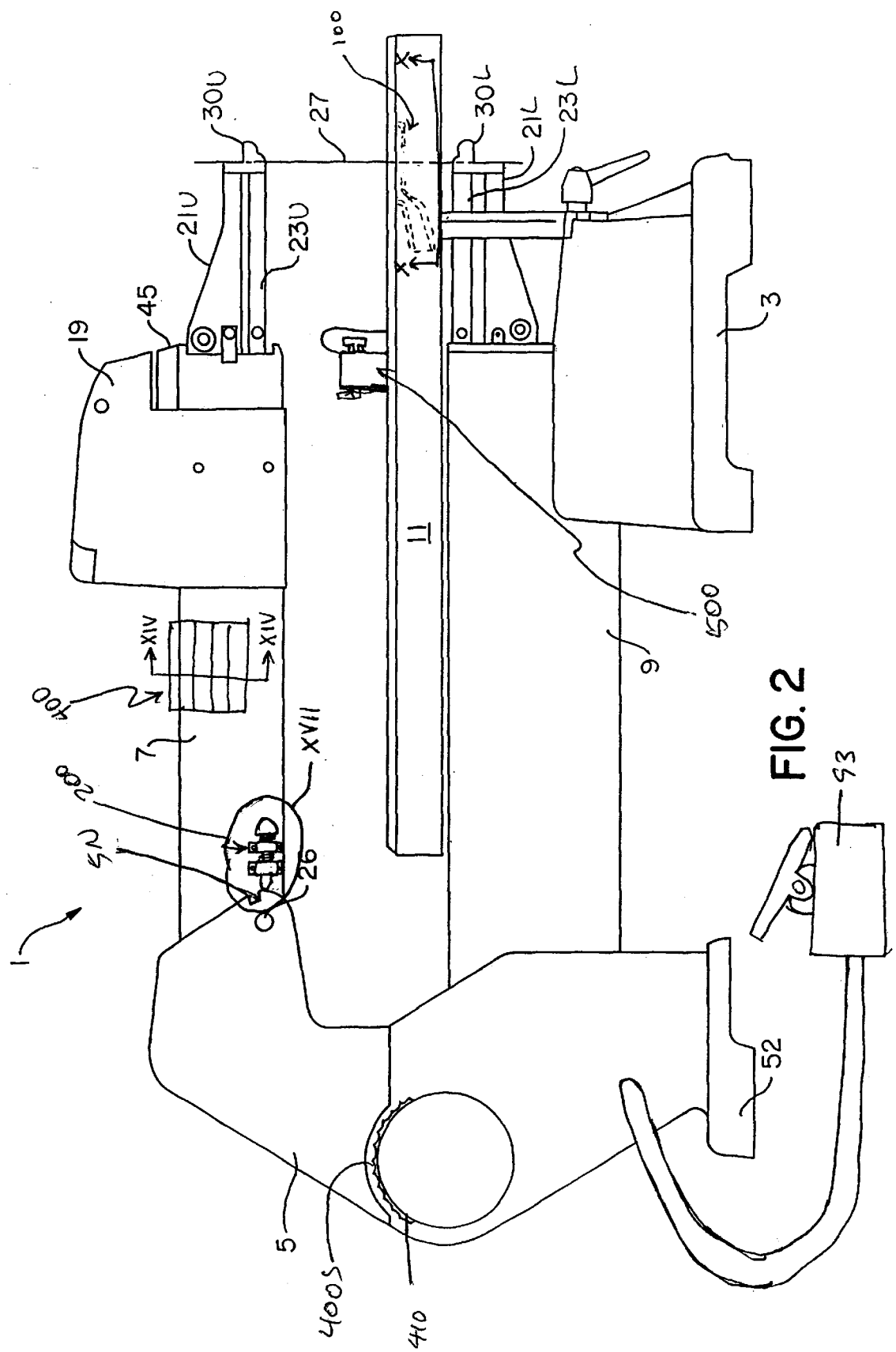
FIG. 2 is a left side elevational view of the scroll saw shown in FIG. 1.

With reference to FIGS. 1 and 2, a scroll saw according to the present invention is shown. Scroll saw 1 includes rear casting or housing 5 having motor housing 6 extending therefrom. The lower end of casting 5 includes rear foot support 5a. Saw 1 also includes front foot support 3. Lower stationary arm 9 extends between and is supported by foot supports 3 and 5a.

Figure 15A:
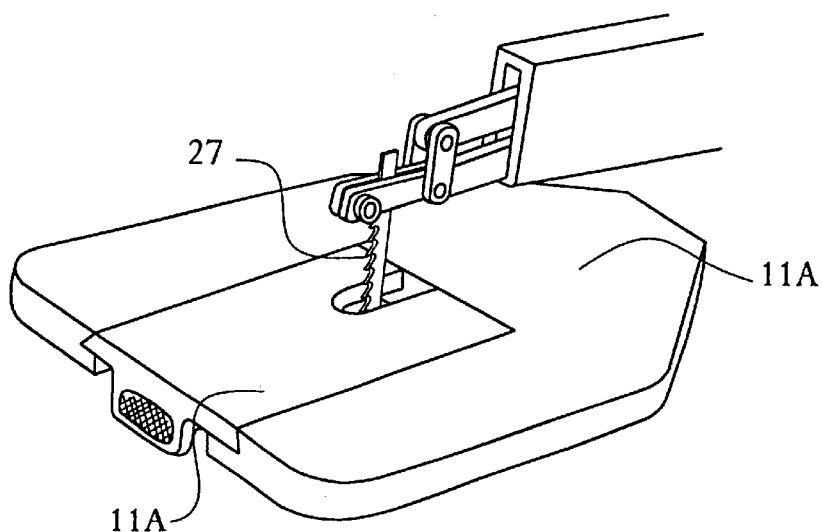
FIGS. 15a and 15b are perspective views showing a slidable auxiliary table in the scroll saw table.
Figure 15B:
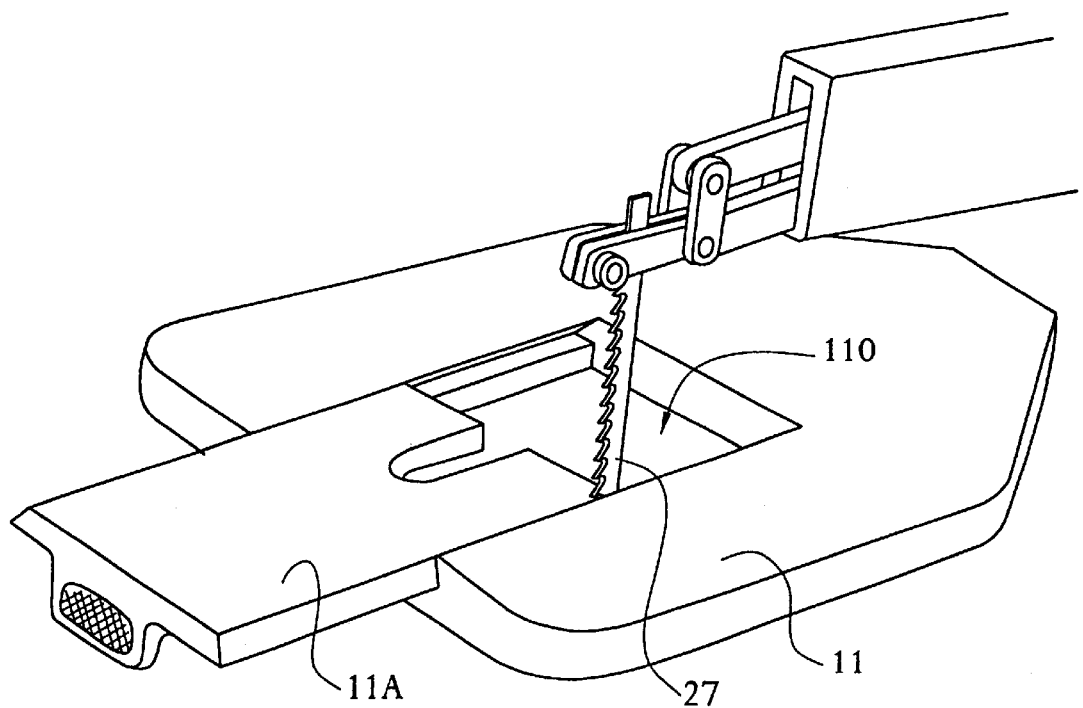

Table 11 is supported jointly by lower stationary arm 9 and a vertical support arm extending from the upper surface of foot support 3. Referring to FIGS. 15a–b, table 11 may have a slidable table 11A disposed therein. The slidable table 11A may have a stop (not shown) which prevents the user from completely pulling out the slidable table 11A. By pulling the slidable table 11A, a larger opening 110 is created. Such opening 110 allows bigger chips to fall through table 11, enabling work to continue without stopping the blade 27 to manually clear the workpiece (not shown).

Referring to FIGS. 1 and 2, upper stationary arm 7 at the rear fits through an opening formed in casting 5, and extends forwardly over table 11. Upper stationary arm 7 is mounted about pivot pin or rod 26 which extends through openings near the rear end of arm 7 and corresponding openings in an upper forward tip portion of casting 5.

As shown in FIGS. 12 and 13, upper stationary arm 7 is mounted within casting 5 with clearances between the upper and lower outer surfaces of arm 7 and the upper and lower inner surfaces of the opening in casting 5. Accordingly, although arm 7 is stationary during operation of the saw, arm 7 may be pivoted upwardly about pivot pin 26.

Figure 3:
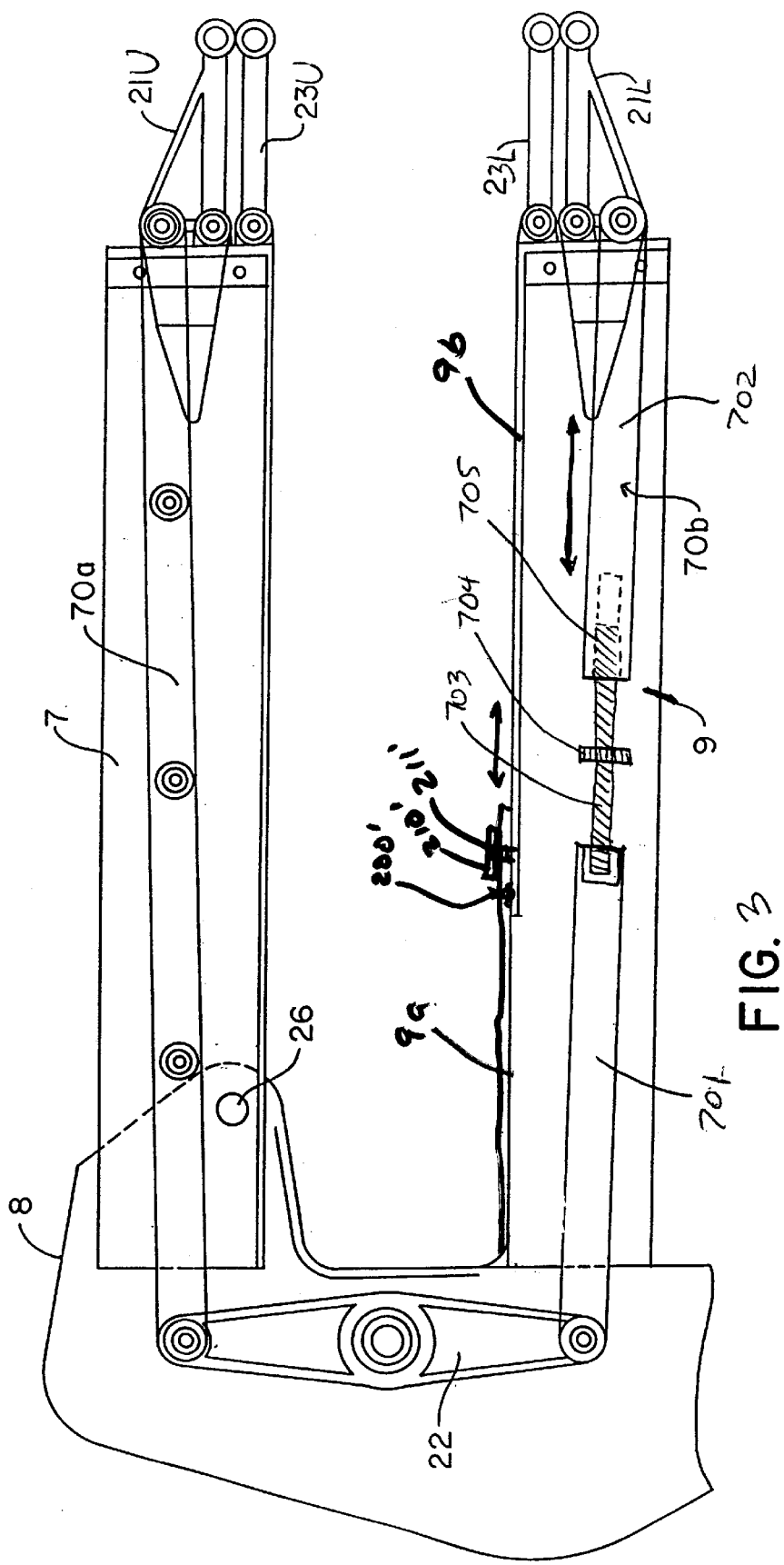
FIG. 3 is a partial left side cutaway view showing a portion of the drive mechanism of the saw shown in FIG. 1 and a first embodiment of the present invention.
Figure 4:
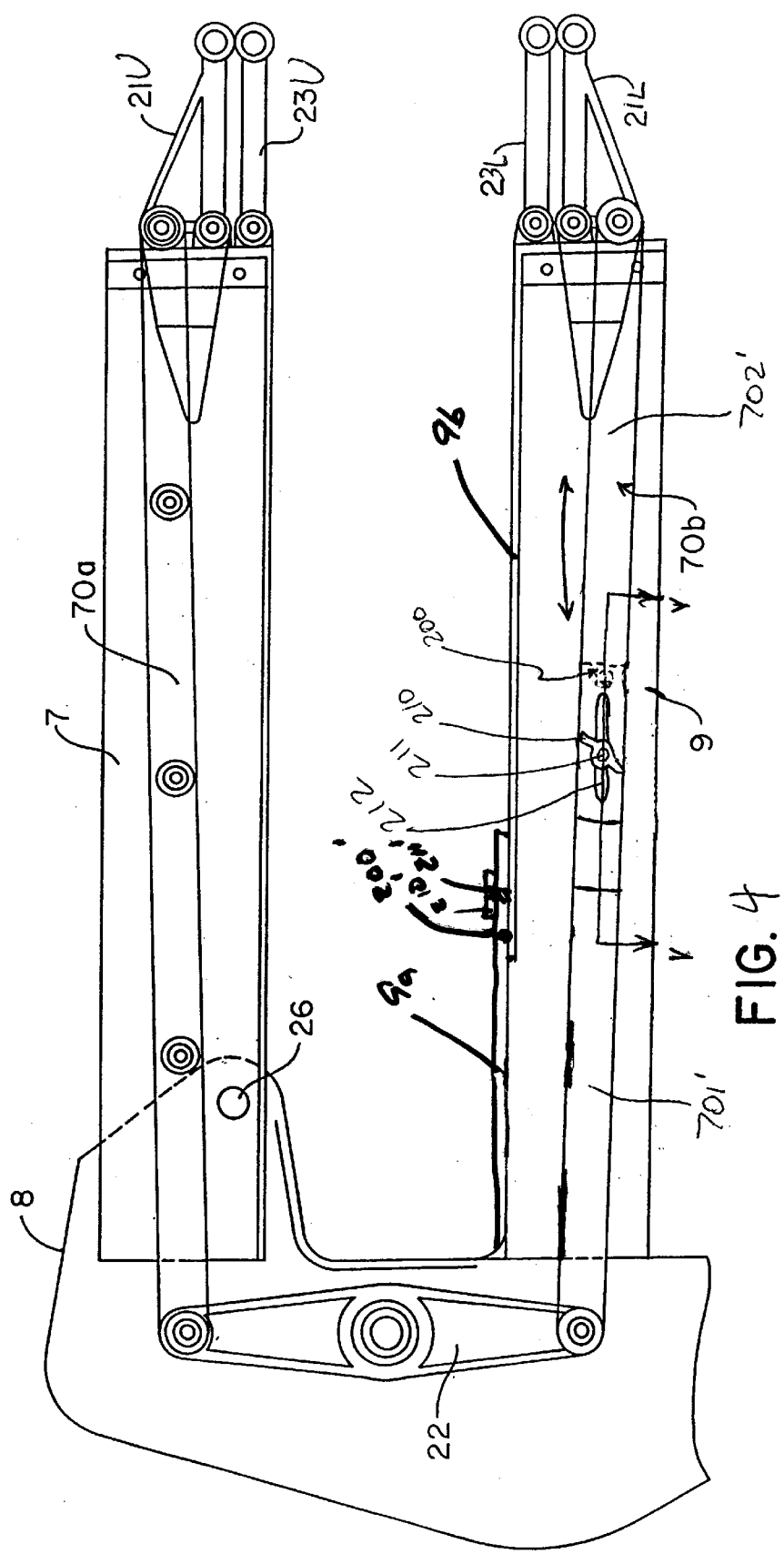
FIG. 4 is a partial left side cutaway view showing a portion of the drive mechanism of the saw shown in FIG. 1 and a second embodiment of the present invention.

With further reference to FIGS. 3 and 4, saw 1 further includes main rocker 22 which is mounted in casting 5 for pivoting about a central pivot pin. Rocker 22 is conventional and is driven to pivot in a reciprocating manner by the motor (not shown) through a conventional linkage (not shown). The motor and linkage do not form part of the invention. Persons skilled in the art will recognize that different types of motors can be used for the scroll saw, including universal motors and switched reluctance motors.

The upper and lower ends of rocker 22 are linked to the rearward ends of upper and lower drive linkages assemblies 70a and 70b, respectively. Upper drive linkage assembly 70a extends through upper stationary arm 7 and lower drive linkage assembly 70b extends through lower stationary arm 9.

Upper rocker arm 21U is mounted at the forward end of drive linkage assembly 70a, and is disposed through the forward open end of stationary arm 7. A rearward portion of rocker arm 21U is disposed within arm 7 and a forward portion of rocker arm 21U is disposed exteriorly of arm 7. The exterior portion of rocker arm 21U has an overall triangular shape. The upper rear corner of the exterior portion of rocker arm 21U is pivotably mounted at the forward end of upper drive linkage assembly 70a. The lower rear corner of the exterior portion of rocker arm 21U is pivotably mounted to a fixed extension of upper stationary arm 7.

Upper strut 23U also is mounted at the forward end of upper stationary arm 7 and extends below and for substantially the same distance as the exterior portion of rocker arm 21U. Strut 23U is pivotably mounted at the rear end to a fixed extension of arm 7. The forward corner of rocker arm 21U is disposed adjacent to and directly above the forward end of strut 23U.

Figure 7:
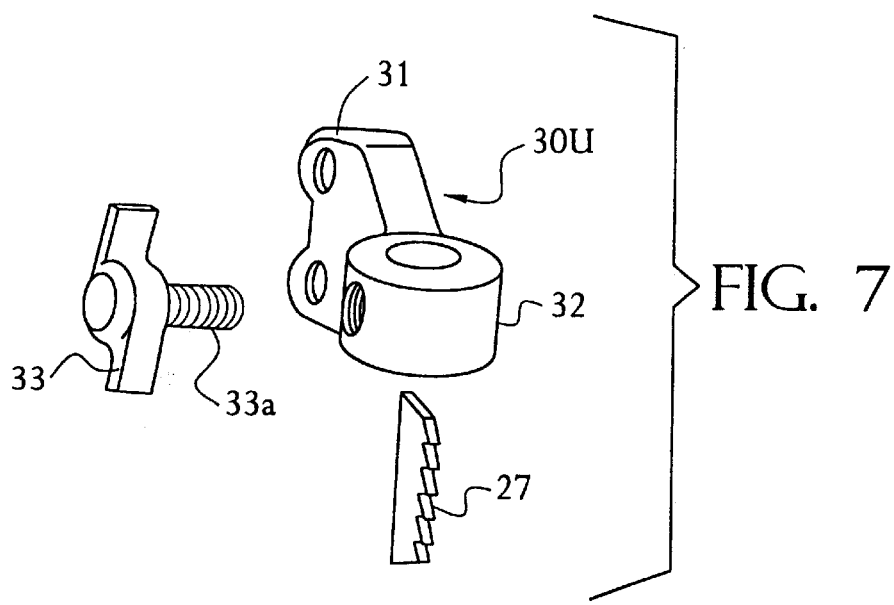
FIG. 7 is a perspective view of a blade clamp used in the saw shown in FIG. 1.
Figure 6:
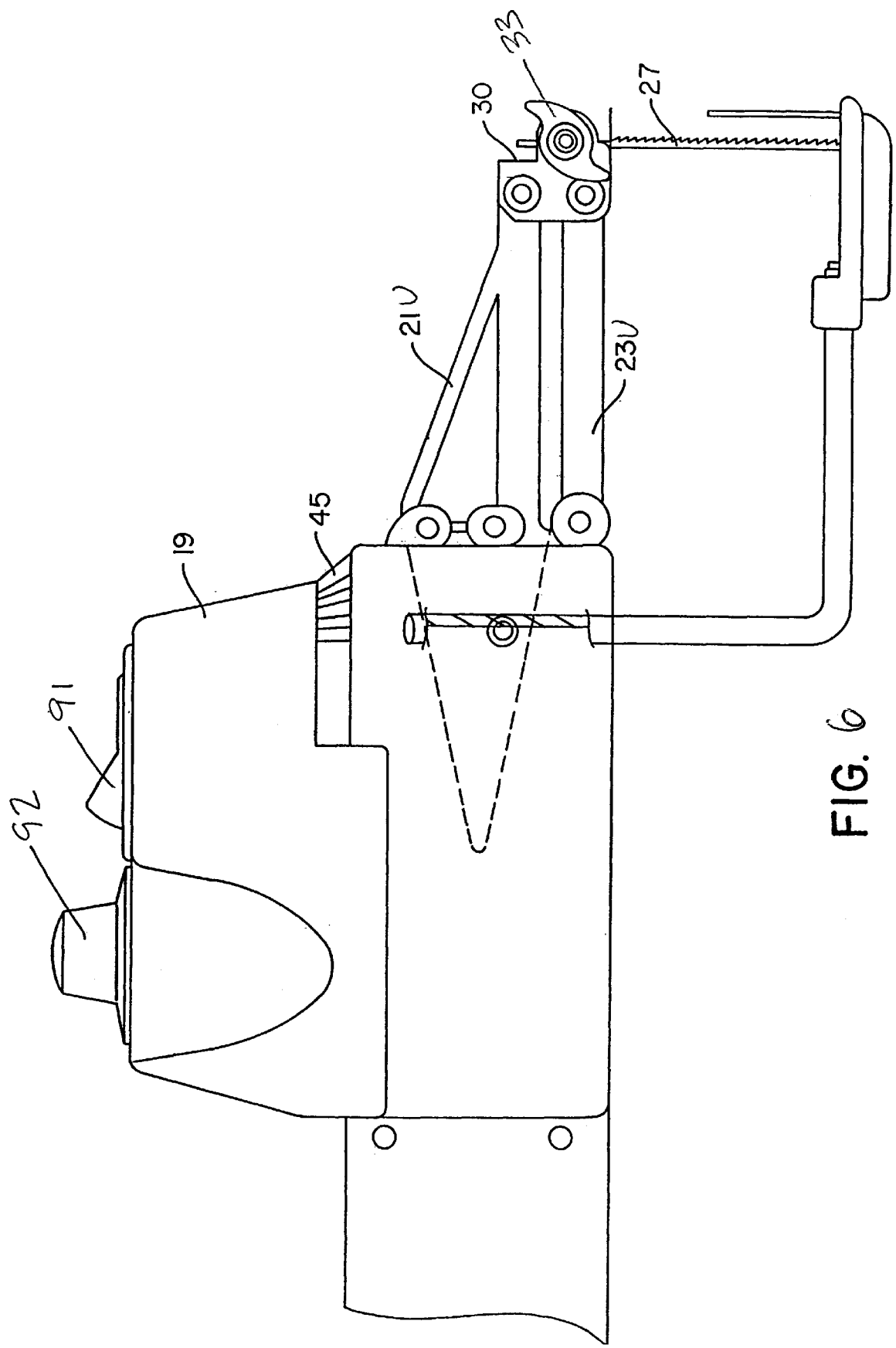
FIG. 6 is a close-up side view taken at the right end of the upper arm of the saw shown in FIG. 1.

With reference to FIGS. 6 and 7, upper blade clamp 30U includes a generally vertical arm 31. An upper end of arm 31 is pivotably secured to the forward corner of rocker arm 21 and the lower end of arm 31 is pivotably secured to the forward end of strut 23. Blade clamp 30U also includes a generally horizontal disc portion 32 extending forwardly from vertical arm 31. Disc portion 32 includes a vertical opening extending through the upper and lower surfaces, and a screw-threaded horizontal opening extending through one side wall. Blade clamp knob 33 includes screw-threaded portion 33a having a flat forward surface. Portion 33a may be removably screwed into the screw-thread opening. In order to secure blade 27 in clamp 30U, blade 27 is inserted through the vertical opening in disc portion 32, and knob 33 is rotated to bring the forward surface of portion 33a into contact with the flat surface of the blade. Blade 27 may be removed by unscrewing knob 33.

The structure of lower rocker arm 21L, lower strut 23L and lower blade clamp 30L secured to lower stationary arm 9 and lower linkage assembly 70b is identical to that of the same elements as described above. However, the orientation of lower rocker arm 21L relative to lower strut 23L is opposite to that of upper rocker arm 21U and upper strut 23U. In particular, lower strut 23L is disposed above lower rocker arm 21L, and lower blade clamp 30L is inverted from upper blade clamp 30U.

In operation, main rocker 22 is pivoted about its pivot point such that the upper and lower ends of rocker 22 reciprocate back and forth, which imparts a reciprocating motion to upper and lower linkage assemblies 70a and 70b within upper arm 7 and lower arm 9. When the upper end of rocker 22 is pivoted forwardly, upper linkage assembly 70a is moved forwardly within upper stationary arm 7. The upper corner of the exterior portion of rocker arm 21U is pushed forwardly, causing rocker arm 21U to pivot clockwise about the lower rear corner of the exterior portion, with the forward corner of rocker arm 21U moving downwardly. Upper strut 23U also pivots downwardly due to the link between rocker arm 21U and strut 23U provided by upper blade clamp 30U. Therefore, blade clamp 30U is moved through a downward arc, but maintains a substantially vertical orientation. Since lower linkage assembly 70b is moved rearwardly simultaneously with the forward movement of upper linkage assembly 70a, and since the vertical orientation of lower rocker 21L and strut 23L is opposite to that of upper rocker 21U and strut 23U, lower blade clamp 30L also is simultaneously moved downwardly through a substantially identical arc, while maintaining a vertical orientation. As a result, both the upper and lower ends of blade 27 are moved downwardly through a vertical arc. When upper linkage assembly 70a and lower linkage assembly 70b are reciprocated in the opposite directions by operation of main rocker 22, blade 27 is moved upwardly along the same arc. In this manner, blade 27 is reciprocated in a vertical plane for sawing action.

Figures 8, 9A, 9B:
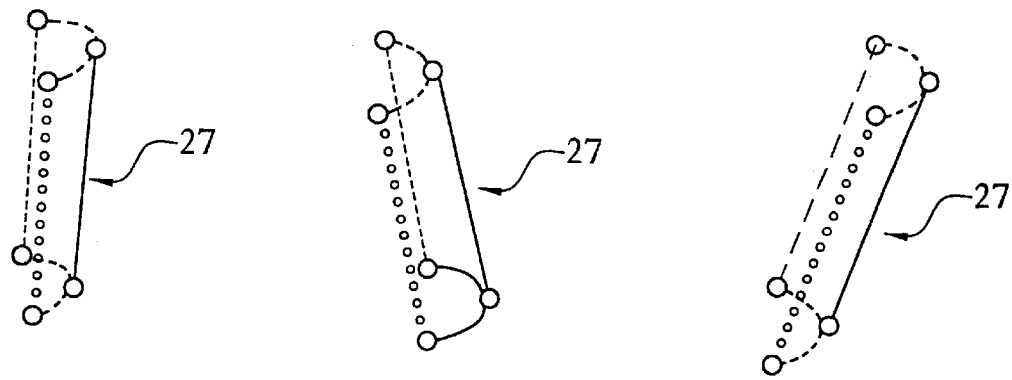
FIG. 8 illustrates the blade cutting path for a blade moving along an arc.
FIGS. 9A and 9B illustrate the blade cutting path for a blade shifted to different selected angles when the lower linkage is extended and retracted, respectively.

FIG. 8 illustrates the cutting path of blade 27 when it moves along its downward arc and as the upper and lower blade clamps 30U and 30L move along their identical arcs, where the solid lines show the middle position, the broken lines show the higher position and the dotted lines show the lower position. This cutting path is used for fine work.

Referring to FIG. 3, the lower linkage assembly 70b includes a rear section 701 and a front section 702. The front section 702 is connected to the lower rocker arm 21L as described above. The rear section 701 is connected to the main rocker 22 as described above. The lower linkage assembly 70b further includes a screw 703 rotatably disposed in rear section 701 and threadingly received by front section 702 via threads 705. A wheel 704 may be fixedly disposed on screw 703 to enable a user to rotate the screw 703. Accordingly, when the user rotates the screw 703, the front section 702 is moved closer to or farther away from the rear section 701. By doing so, the lower linkage 70b is extended or retracted, i.e., the effective length of the lower linkage 70b is changed, thus changing the position of lower blade clamp 30L relative to the upper blade clamp 30U.

This change in relative clamp position shifts the angle of blade 27 relative to a substantially vertical axis. Accordingly, when main rocker 22 is pivoted about its pivot point such that the upper and lower ends of rocker 22 reciprocate back and forth, a reciprocating motion is imparted to upper and lower linkage assemblies 70a and 70b within upper arm 7 and lower arm 9, and thus to upper and lower blade clamps 30U and 30L. Both blade clamps 30U and 30L are moved through a downward arc. However, because the angle of the blade 27, the blade 27 cuts more aggressively than when cutting in a substantially vertical orientation.

FIGS. 9A and 9B illustrate the cutting path of blade 27 when the lower linkage 70b has been extended and retracted, respectively. Again, the solid lines show the middle position, the broken lines show the higher position and the dotted lines show the lower position. As shown in FIGS. 9A and 9B, the cutting path is more aggressive and allows for faster, yet coarser, cuts.

Preferably, lower arm 9 will consist of two portions: a rear portion 9a and a front portion 9b. Rear and front portions 9a and 9b are movable relative to each other, in order to enhance the blade angle variation. The front section 9b further includes a screw 211' fixedly attached to the front section 9b and sliding along a slot (not shown) disposed in the rear section 9a. Accordingly, by sliding the screw 211' along the slot, the front section 9b is moved closer to or farther away from the rear section 9a. By doing so, the position of lower blade clamp 30L relative to the upper blade clamp 30U is changed. A user can then secure the position of the front section 9b relative to the rear section 9a by rotating a knob 210' on the screw 211'.

It may be advisable to provide a detent mechanism 200' on the lower arm 9 to identify when its length is equal to the length of upper arm 7, so the blade 27 is disposed at the substantially vertical position. Preferably, the detent mechanism consists of a spring-loaded ball (not shown) engaging a notch (not shown). Persons skilled in the art are referred to detent mechanism 200 as shown in FIG. 5 and described below.

Persons skilled in the art will recognize that the angle of the blade relative to a substantially vertical axis may be changed without adjusting lower linkage arm 70b. Such result may be obtained by adjusting the position of the front and rear sections 9a and 9b, moving both upper and lower blade clamps 30U and 30L out of alignment.

Figure 5:
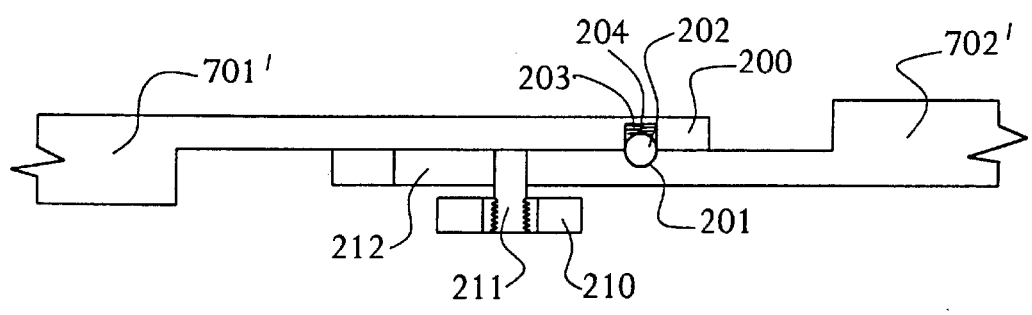
FIG. 5 is a cross-sectional view along line V—V of FIG. 4.

FIGS. 4 and 5 show an alternative embodiment of the lower linkage 70b for obtaining the same result, i.e., a length-variable linkage for changing the angle of the blade relative to a substantially vertical axis, where like parts have like numbers. The lower linkage assembly 70b includes a rear section 701' and a front section 702.' The front section 702' is connected to the lower rocker arm 21L as described above. The rear section 701' is connected to the main rocker 22 as described above.

The rear section 701' further includes a screw 211 fixedly attached to the rear section 701' and sliding along a slot 212 disposed in the front section 702'. Accordingly, by sliding the screw 211 along the slot 212, the front section 702' is moved closer to or farther away from the rear section 701'. By doing so, the lower linkage 70b is extended or retracted, i.e., the effective length of the lower linkage 70b is changed, thus changing the position of lower blade clamp 30L relative to the upper blade clamp 30U. A user can then secure the position of the front section 702' relative to the rear section 701' by rotating a knob 210 on the screw 211.

It may be advisable to provide a detent mechanism 200 on the lower linkage assembly 70b to identify when its length is equal to the length of upper linkage assembly 70a, so the blade 27 is disposed at the substantially vertical position. With reference to FIG. 5, front section 702' has notch 201 facing the rear section 701'. In turn, rear section 701' includes a cylindrical bore 204 facing the front section 702'. The notch 201 and bore 204 are disposed so that, when aligned with each other, the length of the lower linkage assembly 70b is equal to the length of upper linkage assembly 70a.

A spring 203 is disposed in bore 204 and biases ball bearing 202 outwardly from bore 204. When the front section 702' is slid relative to the rear section 701', or vice versa, ball bearing 202 is forced out of notch 201 against the spring bias. Ball bearing 202 is forced into bore 204 and rides along the surface of front section 702' during its movement. When it is desired to reset the length of the lower linkage assembly 70b, the rear and front sections 701 and 702' are slid until bore 204 is opposite notch 201. When the proper location is reached, spring 203 biases ball bearing 202 back into notch 201. Since the ball bearing and notches provide some resistance to the movement of the front and/or rear sections 702' and 701', this arrangement identifies when the length of the lower linkage assembly 70b is substantially equal to the length of the upper linkage assembly 70a. Thereafter, knob 210 is rotated to secure the rear and front sections 701' and 702' against further movement.

Persons skilled in the art will recognize that the slot 212 is preferably narrower than the diameter of the ball bearing 202, in keep the ball bearing 202 from leaving the detent mechanism 200.

Figure 20A:
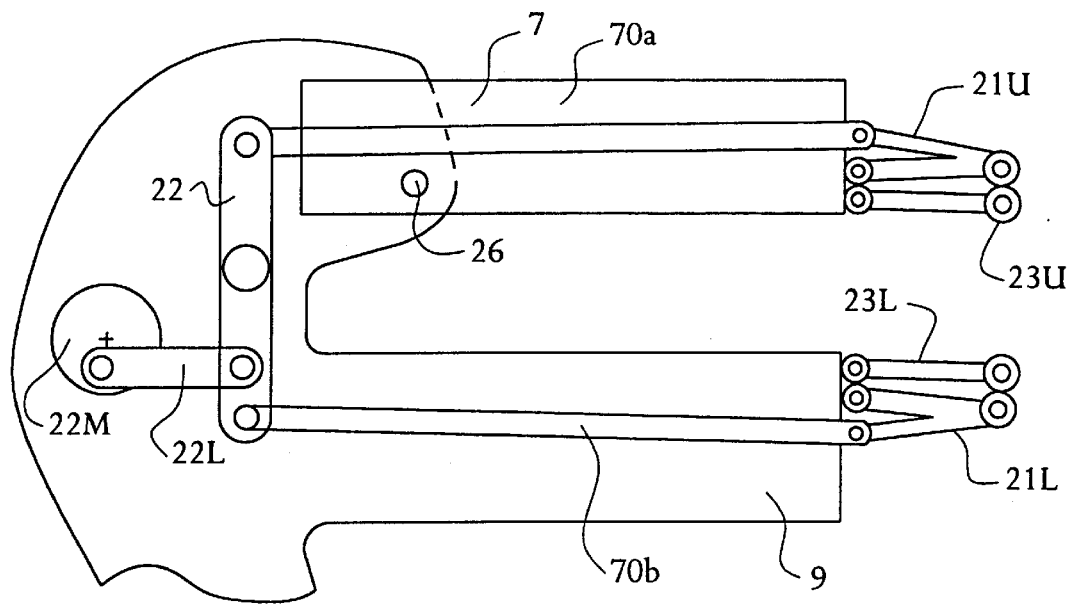
FIGS. 20A and 20B are partial left side cutaway views showing a third embodiment of the present invention.
Figure 20B:
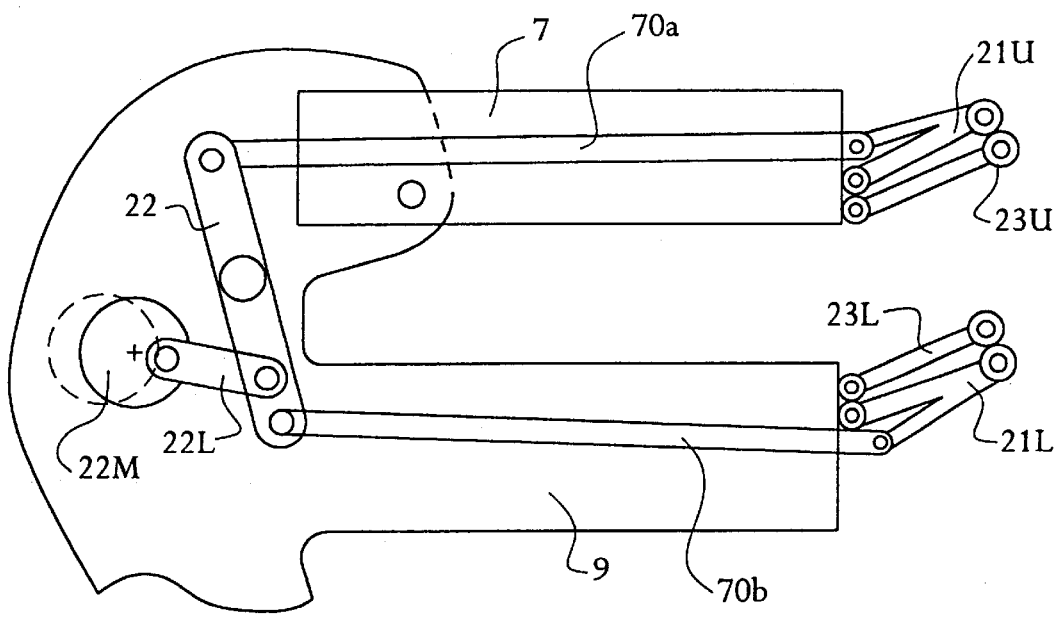

FIGS. 20A and 20B illustrate a third embodiment of the present invention, wherein like numbers refer to like parts and function. Unlike the two embodiments above, the present embodiment differs in that the length of lower drive linkage assembly 70b is not changed by moving front and rear sections relative to each other. Instead, the effective length of lower drive linkage assembly 70b is changed by moving the rocker 22 from the neutral position shown in FIG. 20A.

This can be achieved by changing the position of motor 22M, which is linked to rocker 22 by link 22L. As shown in FIG. 20B, by moving the motor 22M towards the rocker arms 21U and 21L, the rocker 22 is moved so that the upper and lower drive linkage assemblies 70a, 70b is biased rearwardly and forwardly, respectively. This in effect changes the effective length of lower drive linkage assembly 70b relative to upper drive linkage assembly 70a. Because the rocker 22 will maintain the same range of motion as when it was in its neutral position (shown in FIG. 20A), the upper drive linkage assembly 70a will never move forwardly as much as lower drive linkage assembly 70b, causing the coarser, more aggressive cut.

Persons skilled in the art will recognize that the same result is obtained by providing a variable length link 22L that can be made longer or shorter in a similar manner as lower drive linkage assembly 70b as shown in FIGS. 3–5. Accordingly, movement of rocker 22 can be obtained by changing the length of link 22L, instead of moving motor 22M.

With further reference to FIGS. 12a–d, a blade tensioning adjustment mechanism will be described. The mechanism includes wedge 41 having rectangular slots or channels 41b formed in both the left and right side walls. Slots 41b divide wedge 41 into an upper and lower portion, with upper surface 41c of the upper portion inclined relative to channels 41b. Wedge 41 also includes longitudinally extending screw-threaded bore 41a. Upper stationary arm 7 includes rectangular cut-out portion 7a formed through the upper rear portion. The peripheral surfaces of cut-out portion 7a fit within channels 41b such that wedge 41 may slide along the cut-out portion, with the upper portion of wedge 41 disposed above upper stationary arm 7 and the lower portion of wedge 41 disposed within upper stationary arm 7. Upper surface 41c of wedge 41 also is inclined relative to the upper surface of stationary arm 7. In addition, the upper surface of casting 5 is slightly inclined to form ramp 8. Upper surface 41c is disposed adjacent ramp 8.

The blade tensioning mechanism further includes screw-threaded draw rod 43 extending through upper stationary arm 7. The rearward end of rod 43 is screwed into bore 41a of wedge 41. The forward end of draw rod 43 includes upwardly turned arm 43a. Arm 43a fits within track 45b of cam 45. Cam 45 is horizontally and rotatably mounted within head casting 19 at the front of stationary arm 7 and includes handle 45a extending through an opening in casting 19. Rotation of cam 45 by handle 45a causes track 45b to move along arm 43a. Track 45b is formed as an outward spiral such that radially inner end "a" of track 45b is closer to the center point "c" of cam 45 than radially outer end "b". As a result, rotation of cam 45 forces arm 43a and rod 43 to undergo translational motion generally along the longitudinal axis of rod 43. In particular, when cam 45 is rotated such that arm 43a is located near inner end "a", rod 43 is in the forward-most position relative to arm 7, and when cam 45 is rotated such that arm 43a is located near radially outer end "b", rod 43 is in the rearward-most position. One surface of track 45b is formed by a succession of arcuate surfaces which serve as seating surfaces for arm 43a. Each seating surface corresponds to a preset translational position for rod 43 relative to stationary arm 7.

The tension of blade 27 may be adjusted by rotating handle 45a to thereby adjust the translational position of rod 43. As described above, rotation of cam 45 in the direction shown by the curved arrow in FIG. 12b–c, results in translational movement of rod 43 and thus wedge 41 in the direction of the straight arrows shown in FIGS. 12a–b. Since upper inclined surface 41c of wedge 41 is disposed adjacent ramp 8, when wedge 41 moves forwardly (to the right) from a rear position, the contact between surface 41c and ramp 8 pushes wedge 41 downwardly. Since wedge 41 is secured to the rear end of upper stationary arm 7, the rear end of the arm also is forced downwardly, causing arm 7 to pivot counter-clockwise about pivot rod 26. Accordingly, the front end of arm 7 is forced upwardly, causing a corresponding upward force to act upon the upper end of blade 27. Since the position of the lower end of blade 27 is fixed, blade 27 is stretched, increasing the tension.

Similarly, the tension on blade 27 can be reduced by rotation of cam 45 so as to force rod 43 and wedge 41 rearwardly. Since the contact point between upper surface 41c and ramp 8 is moved upwardly, the rear end of stationary arm 7 may be moved upwardly, allowing arm 7 to pivot clockwise about pivot rod 26. Arm 7 undergoes such counterclockwise pivoting due to the weight of the various elements disposed on the forward end of arm 7, and their greater distance from the pivot axis than the rear of arm 7. The front end of arm 7 moves downwardly, reducing the tension of blade 27. Cam 45 may be rotated to tension blade 27 through a predetermined range having predetermined tension settings corresponding to the seating surfaces in track 45b.

Figure 13A:
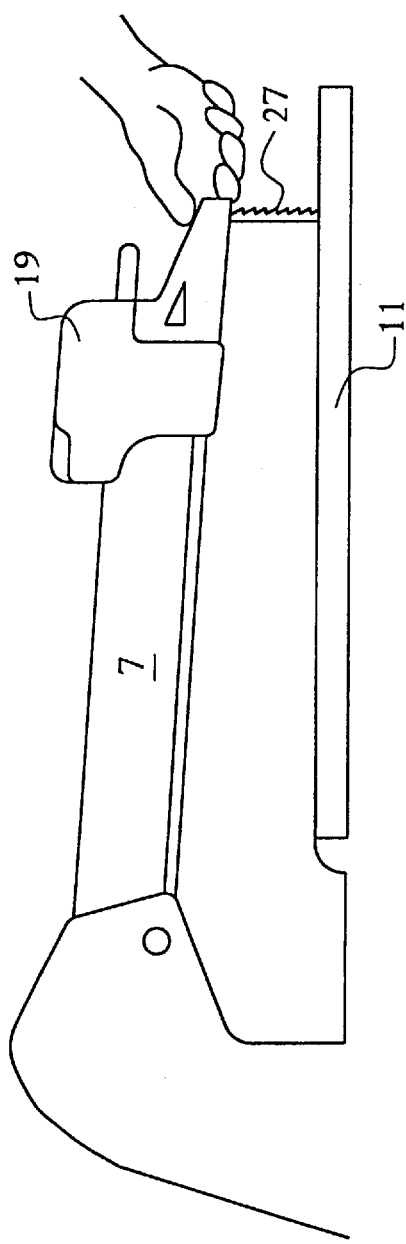
FIGS. 13a–13b are partial side elevational views of the scroll saw shown in FIG. 1 and illustrating a technique for quickly inserting a blade through an opening in a workpiece.
Figure 13B:
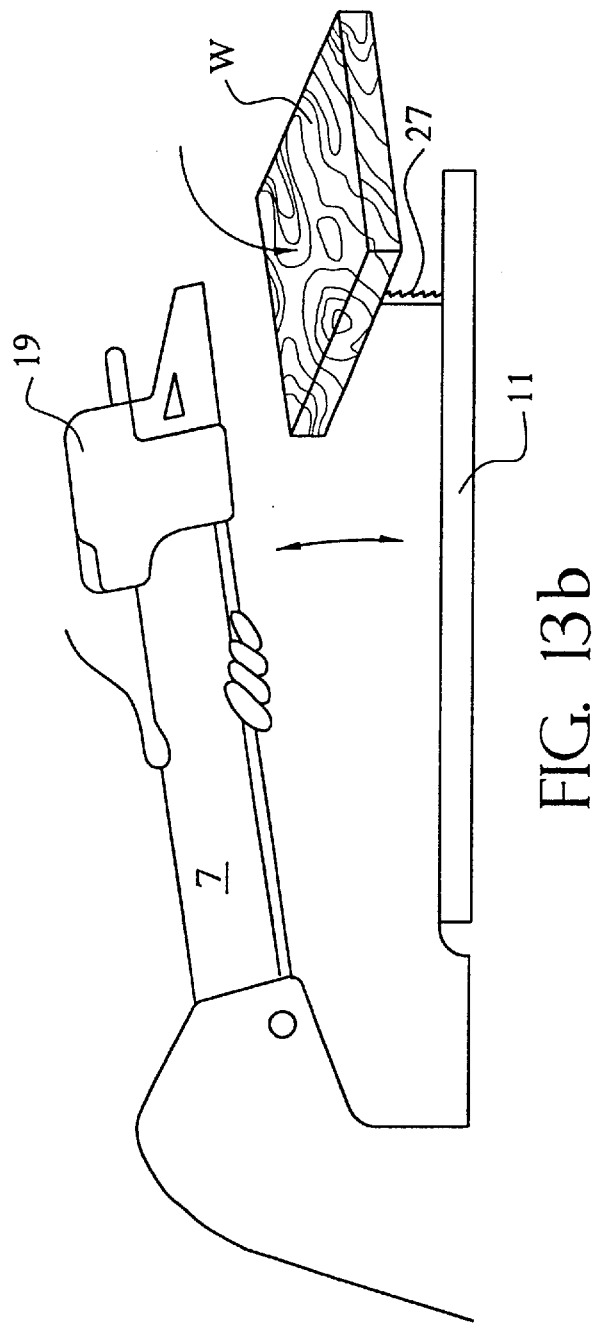

With reference to FIGS. 13a–b, a technique for inserting the blade through an opening in a workpiece for sawing from the interior of the opening will be described. This technique takes advantage of the freedom of upper stationary arm 7 to pivot about pivot rod 26. In FIG. 13a, the saw is shown in the normal operating position, with arm 7 disposed substantially parallel to table 11, and blade 27 disposed vertically through an opening in the table. Blade 27 is secured in blade clamps 30 at both its upper and lower (See FIG. 2) ends. In order to insert blade 27 through an opening in a workpiece, the upper end of blade 27 is released from upper blade clamp 30 by unscrewing blade clamp knob 33. Upper stationary arm 7 is then pivoted upwardly about pivot rod 26 as shown in FIG. 13b. Workpiece W is then placed on table 11 with the free upper end of blade 27 inserted through the opening in the workpiece. Upper stationary arm 7 is then lowered back into the normal operating position, and knob 33 is re-tightened to secure the upper end of blade 27. If desired, the tension of blade 27 can then be adjusted as described above.

Figure 17:
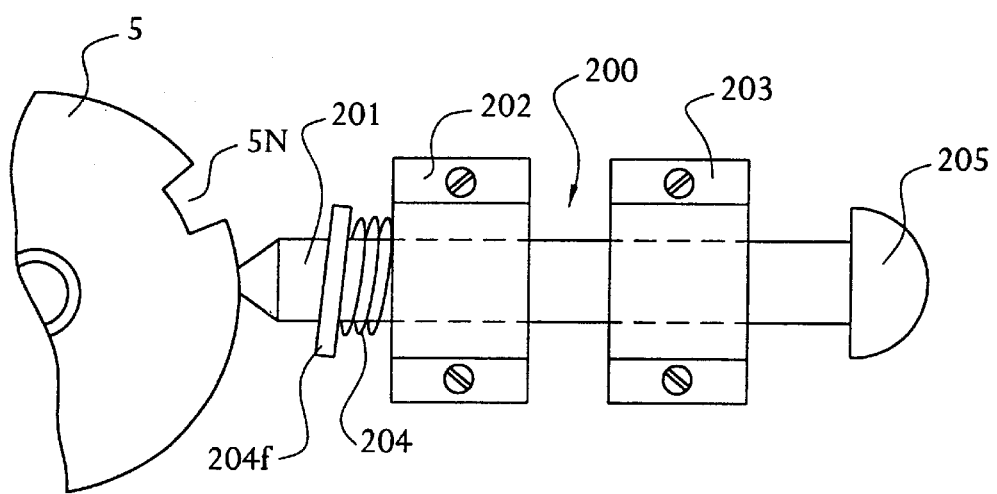
FIG. 17 is a detailed view of the arm detent mechanism shown within circle XVII in FIG. 2.

This technique can be improved by providing a detent mechanism 200 to maintain the upper stationary arm 7 in the upwardly pivoted position. Referring to FIGS. 2 and 17, the detent mechanism 200 preferably disposed on upper stationary arm 7. The detent mechanism 200 preferably includes a pair of brackets 202, 203 fixedly attached to the upper stationary arm 7, a pin 201 slidably disposed within the brackets 202, 203, and a knob 205 disposed at an end of the pin 201. The casting 5 has a notch 5N to be engaged by the pin 201 when the upper stationary arm 7 is pivoted upwardly.

Accordingly, when the user pivots the upper stationary arm 7 upwardly, he can engage notch 5N with pin 201, so that the arm 7 will maintain its upward position. When the user desires to lower the arm 7, the user need only pull pin 201 from notch 5N via knob 205 and lower the arm 7.

Preferably knob 205 and bracket 203 are connected with a spring 204. Spring 204 biases 201 towards casting 5, and thus towards notch 5N. In this manner, the pin 201 will engage notch 5N automatically and without any user intervention.

The provision of pivoting upper arm 7 also provides for quick blade changing. Blade changing requires that blade 27 be fitted through an opening in table 11. The blade may be quickly changed by loosening the lower end of blade 27, and pivoting arm 7 upwardly until the lower end of blade 27 clears through the opening. Blade 27 is then unclamped from upper blade clamp 30 and is replaced by a new blade. Arm 7 is lowered and the new blade is threaded through the opening in table 11, and the lower end is secured in lower clamp 30. The newly installed blade can be tensioned as desired.

Of course, either of the above-discussed procedures could be reversed. That is, for threading a blade through a workpiece, lower blade clamp 30 could be loosened and the blade could be threaded through the workpiece by lowering arm 7 with the blade secured thereto. For quick blade change, upper blade clamp 30 could be loosened and upper arm 7 can be pivoted upwardly out of the way. Thereafter, the lower blade clamp would be loosened and the blade pulled upwardly through table 11 by hand.

Figure 16:
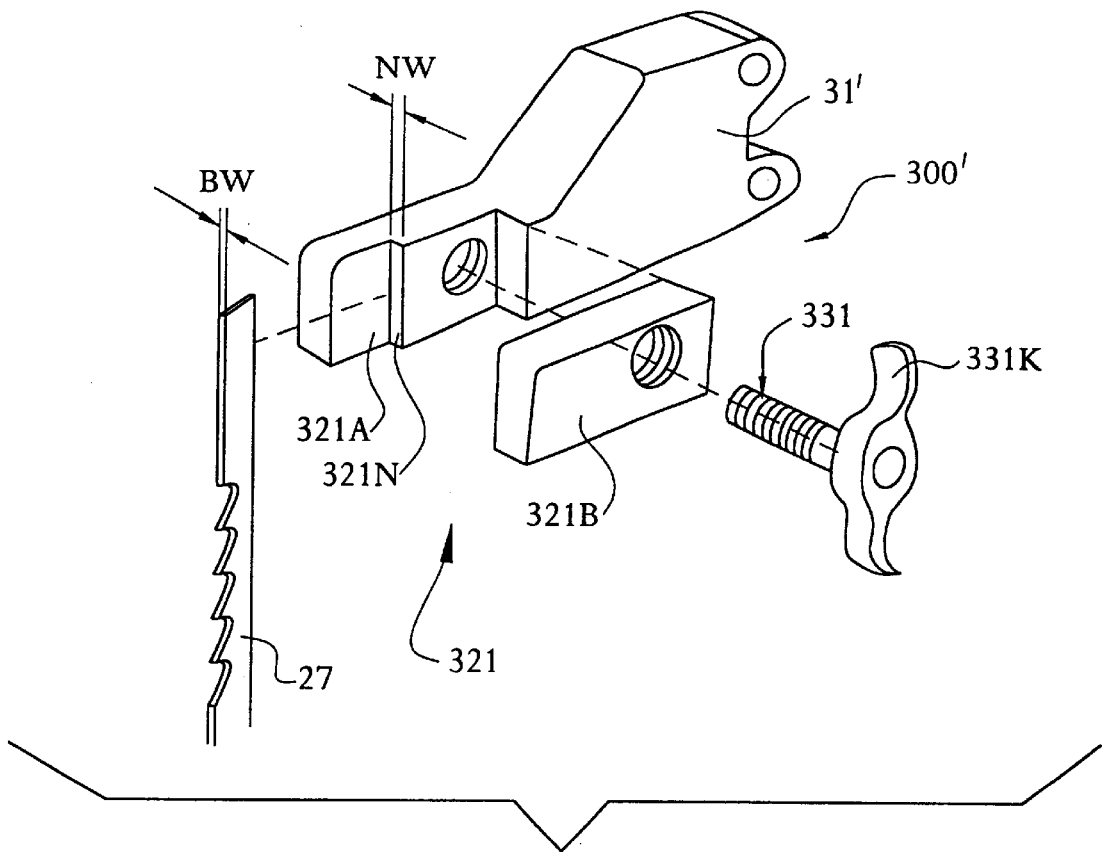
FIG. 16 is a perspective view of a second embodiment of a blade clamp.

A second embodiment of the blade clamp will also facilitate quick blade changes. Referring to FIG. 16, upper blade clamp 30U' includes a generally vertical arm 31'. An upper end of arm 31' is pivotably secured to the forward corner of upper rocker arm 21U and the lower end of arm 31' is pivotably secured to the forward end of upper strut 23U. Blade clamp 30U' also includes a clamping portion 321A extending forwardly from vertical arm 31'. Portion 321A includes a vertical ledge 321N. This ledge has a width NW, which is narrower than the width BW of blade 27.

When installing the blade 27, the user need only to rest it against the ledge 321N to ensure perpendicular attachment to the blade clamp 30U'. If the lower blade clamp 30L has the same construction, the user can then easily align the blade 27 relative to the clamps by resting the blade 27 against the corresponding ledges 321N. The user then only needs to attach locking portion 321B to the clamp 30U'. Preferably, a screw 331 is used to attach the locking portion 321B. The screw 331 may have a knob 331K to enable tightening the clamp without using any tools.

Another feature of the present invention is the location of the main controls. Referring to FIG. 6, an on-off switch 91 is preferably disposed on the head casting 19. Such placement enables the user to easily commence and terminate operation of the saw. The switch 91 is part of the scroll saw's electrical system, as is well known in the art. It is also preferable to dispose a speed control knob 92 on the head casting 19. Such placement enables the user to control the cutting speed of the saw. A means to control the cutting speed, such as a potentiometer 92R (FIG. 19), etc., is well known in the art.

Figure 19:
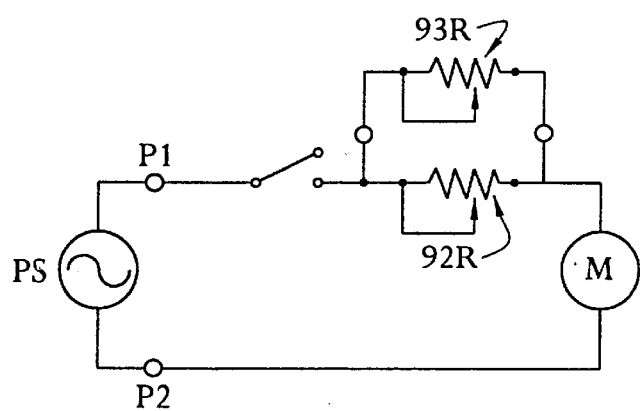
FIG. 19 is a schematic diagram of the scroll saw circuit.

FIG. 19 shows the circuit schematic diagram for the scroll saw 1. As shown there, a power source PS is connected to the scroll saw 1 via plug P1, P2. The switch 91 and the potentiometer 92R are disposed between the power source PS and the motor M. A second potentiometer 93R may be disposed in parallel to the potentiometer 92R. The potentiometer 93R is disposed within a foot controller 93 (FIG. 2) for hands-free cutting speed control.

Figure 10:
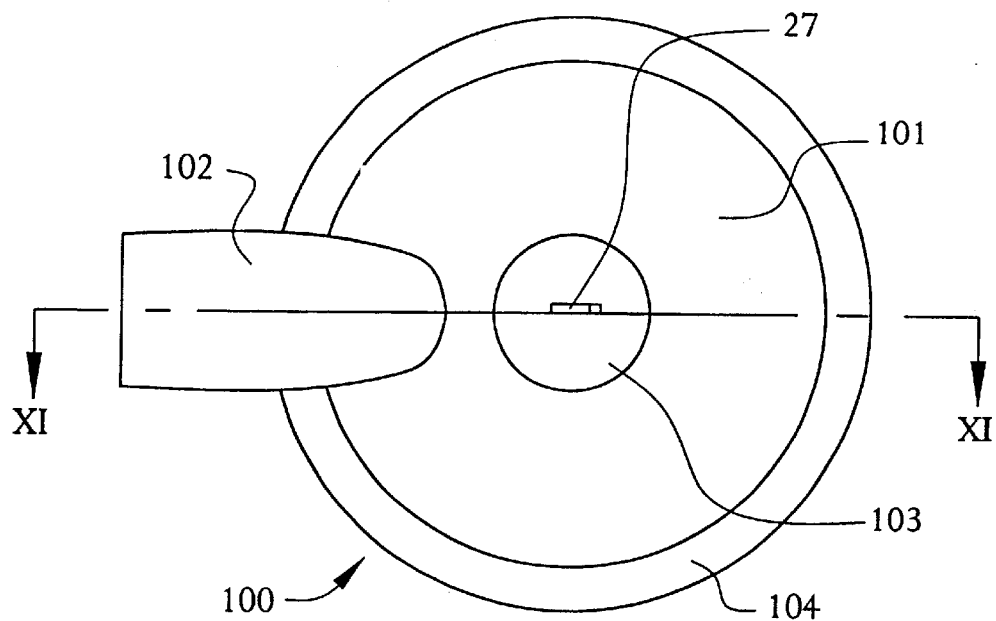
FIG. 10 is a bottom plan view along line X—X of FIG. 2.
Figure 11:
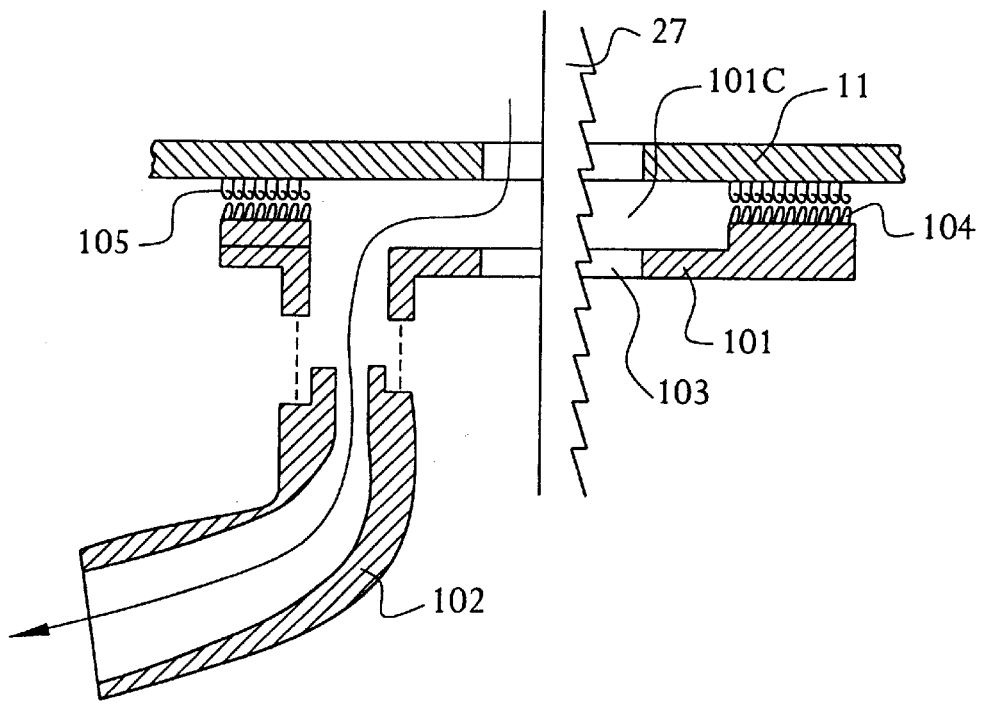
FIG. 11 is a cross-sectional view along line XI—XI of FIG. 10.
Figure 12A:
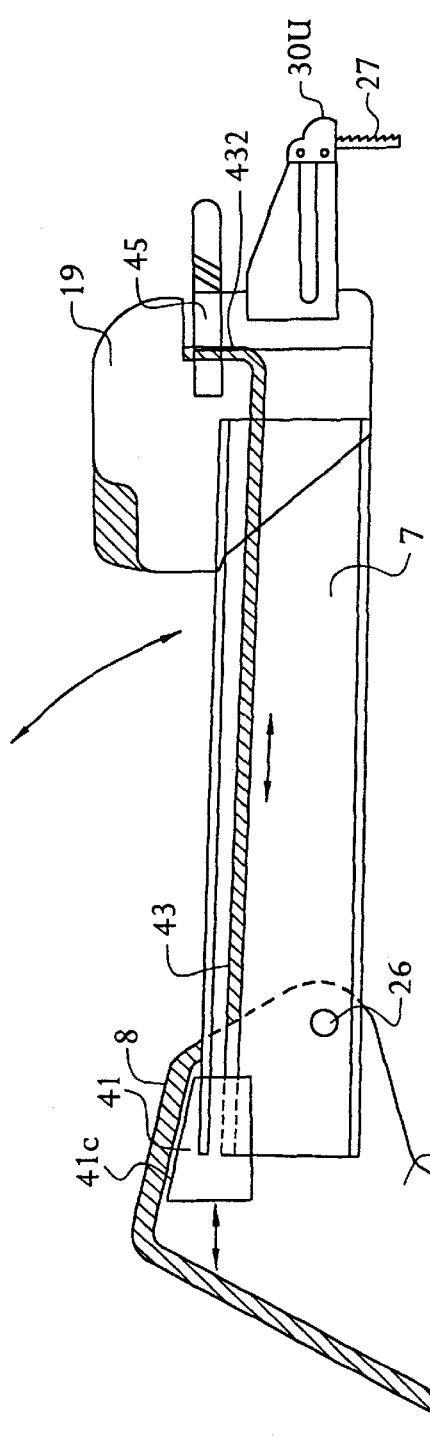
FIG. 12a is a cutaway side elevation view of the upper arm of the saw shown in FIG. 1 illustrating the blade tension adjustment mechanism.
Figure 12B:
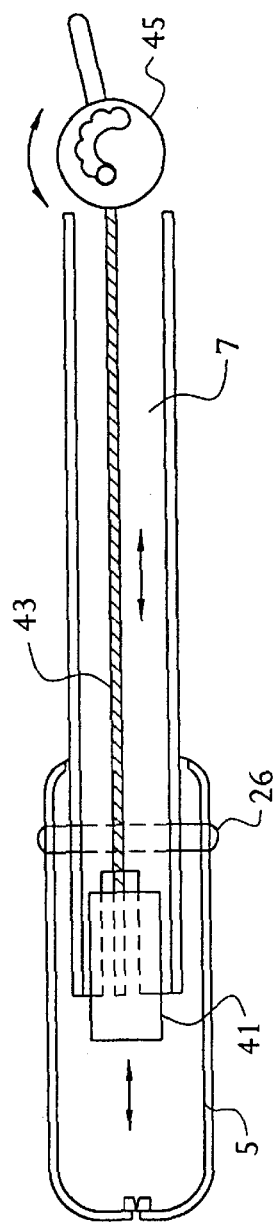
FIG. 12b is an overhead cutaway view of the upper arm of the saw shown in FIG. 1 illustrating the blade tension adjustment mechanism.
Figure 12C:
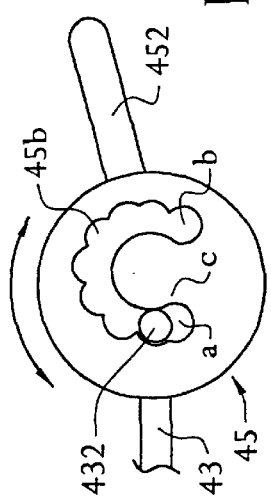
FIG. 12c is a horizontal cross-sectional view of a cam forming part of the blade tension adjustment mechanism.
Figure 12D:
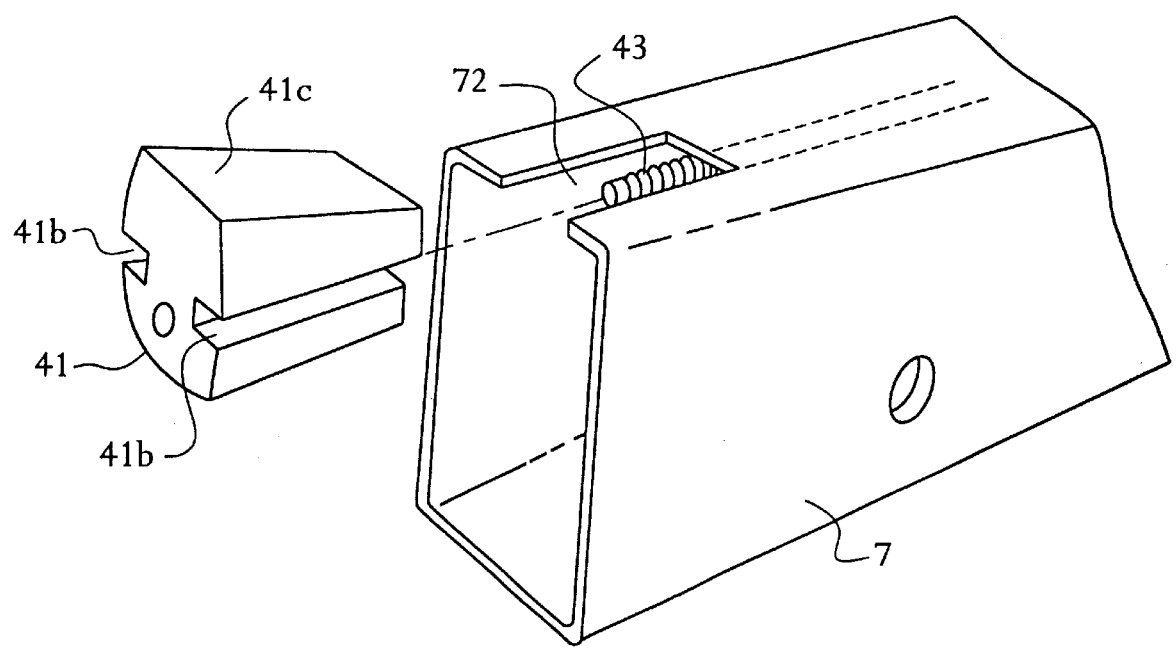
FIG. 12d is a perspective view showing a slidable wedge and a cutout in the upper arm which form part of the blade tension adjustment mechanism of FIGS. 12a–c.

Another feature of the present invention is the dust collector 100. Referring to FIGS. 2, 10 and 11, dust collector 100 is attached underneath table 11. The dust collector 100 may include a main body 101 and an exhaust duct 102 attached to the main body 101. The main body 101 is preferably circular and may have a hole 103 in its center to allow the blade 27 to extend therethrough. It is preferable to minimize the size of hole 103, in order to maximize the quantity of dust channeled through dust collector 100.

The main body 101 may also have a raised foot portion 104 disposed at its periphery. Having a raised foot portion 104 creates a chamber area 101C where the dust travels through before exiting via the duct 102.

The main body 101 may be removably attached to table 11 via hook-and-loop fabrics 105 disposed on the foot portion 104 and the corresponding areas of table 11. Similarly, body 101 may be attached to table 11 via screws, pins, magnets, etc.

The duct 102 may be removably attached to the main body 101. Preferably the duct 102 can be rotated, so that the dust path can be changed when the table 11 is tilted. The duct 102 in turn may be connected to a vacuum source or a dust bag.

Figure 18:
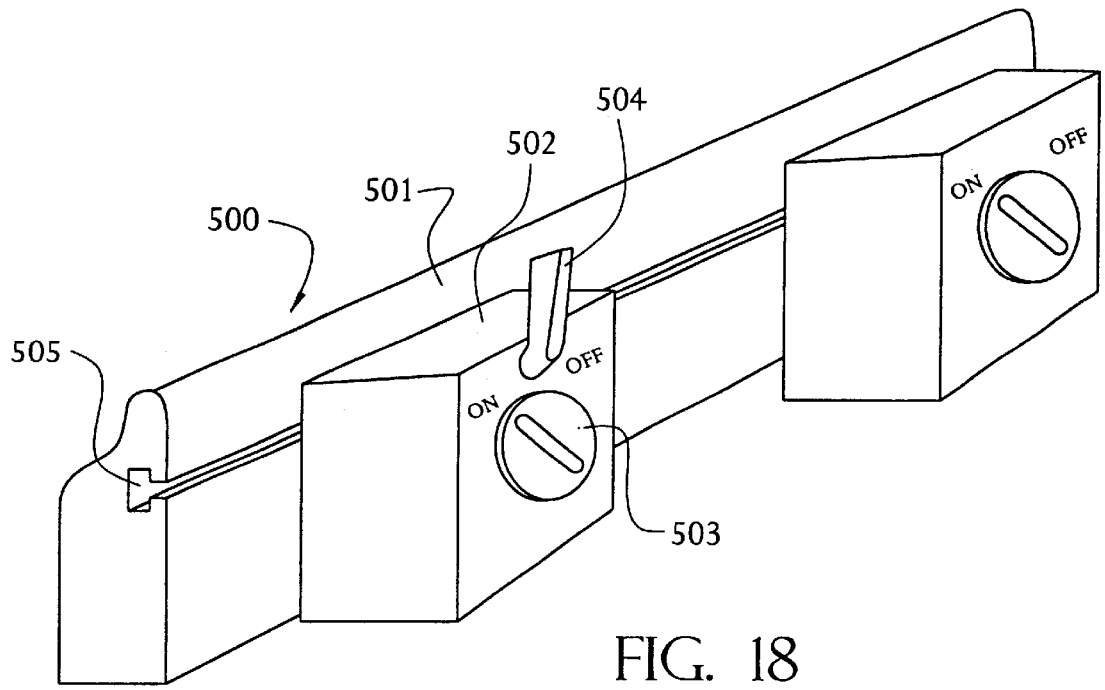
FIG. 18 is a perspective view of the magnetic fence assembly shown in FIG. 2.

Referring to FIGS. 2 and 18, a fence 500 may be disposed on table 11. Fence 500 is preferably magnetically attached to table 11. Accordingly, table 11 is preferably constructed of iron, other ferromagnetic materials, or any material that is responsive to magnetic forces. Fence 500 may include magnetic blocks 502 and a fence face 501 attached to the blocks 502. The fence face 501 may be constructed of extruded aluminum.

Preferably, the fence face 501 is slidably attached to the blocks 502. The fence face 501 may have a channel 505 receiving a nut or T-strip (not shown) threadably connected to a screw (not shown), which in turn is connected to knob 504, as is well known in the art. Accordingly, when the user desires to lock the fence face 501 in place, the user need only rotate knob 504.

Blocks 502 may contain permanent magnets. Preferably, blocks 502 contain electrical magnets (not shown) which may switched on or off via switch 503 for easy installation and removal.

Figure 14:
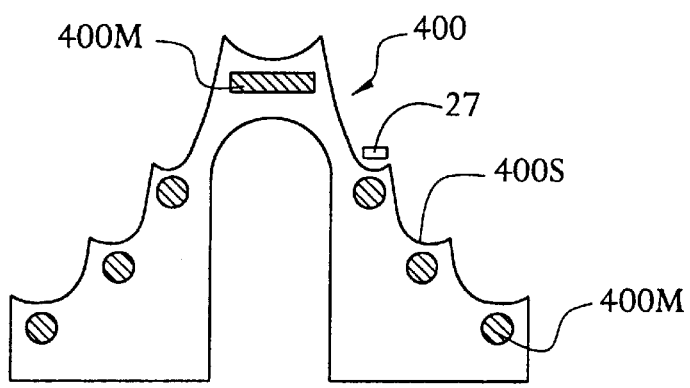
FIG. 14 is a cross-sectional view of the blade holder shown in FIG. 2 along line XIV—XIV.

Referring to FIGS. 1, 2 and 14, a magnetic blade holder 400 may be provided on the scroll saw 1. Preferably, the blade holder 400 is disposed on the upper arm 7, where it can easily be reached by a user. The blade holder 400 may have a series of "steps", or channels, 400S disposed thereon for holding the blades 27. The blade 27 is kept in place by a magnet 400M disposed underneath the corresponding step 400S. Alternatively, the entire blade holder 400 may be made of a magnetic material, obviating the need for separate magnets.

Magnetic blade holder 410 also has a series of steps 400S. However, it does not have a magnet 400M under each step, as the holder 410 is disposed on the motor housing surrounding the motor 6. Because the motor 6 creates an electromagnetic field as it operates, the blades 27 are held in the respective steps by the electromagnetic field of the motor 6.

Persons skilled in the art may also recognize other alternatives to the means disclosed herein. However, all these additions and/or alterations are considered to be equivalents of the present invention.

What is claimed is:

1. A saw comprising:
   a frame with a worktable for supporting workpieces;
   first and second blade clamps for clamping a blade therebetween;
   an oscillating mechanism disposed within the frame, the oscillating mechanism moving the first and second blade clamps in a direction along a substantially vertical axis and comprising a first arm connected to the first blade clamp and a second arm connected to the second blade clamp, said first and second arms being interconnected via the blade and a linking element;
   wherein the first arm comprises a first section connected to the first blade clamp and a second section connected to the linking element, said first and second sections being movable relative to each other so that length of the first arm can be changed to shift the blade to a selected angle from the vertical axis, and wherein length of the second arm is substantially nonadjustable.

2. The saw of claim 1, wherein the first arm further comprises a screw connecting the first and second sections.

3. The saw of claim 1, wherein the first section has a slot therethrough, and the second section has a screw sliding along the slot.

4. A method for varying type of cut in a saw, the method comprising:
   providing a frame with a worktable for supporting workpieces, first and second blade clamps for clamping a blade therebetween, an oscillating mechanism disposed within the frame, the oscillating mechanism moving the first and second blade clamps in a direction along a substantially vertical axis and comprising a first arm connected to the first blade clamp and a second arm connected to the second blade clamp, said first and second arms being interconnected via the blade and a linking element, the second arm having a substantially nonadjustable length; and
   changing length of the first arm so that the blade is shifted to a selected angle from the vertical axis.

5. The saw of claim 1, said frame comprising:
   a rear casting;
   first and second frame arms connected to and forwardly extending from the casting, the first and second arms supporting the first and second blade clamps, the first frame arm being pivotably attached to the casting and pivotable between a first position towards the worktable and a second position away from the worktable; and
   a detent mechanism disposed on the first frame arm for maintaining the first frame arm in the second position.

6. The saw of claim 5, wherein the detent mechanism comprises a pin disposed on the arm engaging a notch in the casting.

7. The saw of claim 6, wherein the detent mechanism further comprises a spring biasing the pin towards the notch in the casting.

8. The saw of claim 6, wherein the pin is mounted on outside of the arm.

9. The saw of claim 1, further comprising:
   a dust collector attached to the underside of the worktable having a main body forming a substantially enclosed chamber and an exhaust duct connected to the main body.

10. The saw of claim 9, wherein the dust collector is removably attached to the work table.

11. The saw of claim 10, wherein the dust collector is attached to the work table with magnets.

12. The saw of claim 9, wherein the duct is removably attached to the dust collector.

13. The saw of claim 1, further comprising a fence disposed on the worktable comprising:
    at least one magnetic block; and
    a fence face attached to the magnetic block.

14. The fence of claim 13, wherein the fence face is slidably attached to the magnetic block.

15. The fence of claim 13, wherein the magnetic block comprises an electromagnet.

16. The saw of claim 1, wherein the first blade clamp comprises:
    an arm portion connectable to a saw;
    a clamping portion extending forwardly from the arm portion, the clamping portion comprising a vertical ledge portion having a smaller width than the width of the saw blade; and
    a locking portion attached to the arm portion.

17. The saw of claim 1,
    wherein the worktable is disposed between the first and second blade clamps and has a hole through which the blade may extend; the saw further comprising a removable table disposed on the worktable for selectively increasing the size of the hole.

18. The saw of claim 1, further comprising a magnetic blade holder disposed on the frame comprising:
    a magnetic main body; and
    at least one storage cavity disposed on the upper side of the main body.

19. The blade holder of claim 18, wherein the main body comprises a magnet disposed underneath the storage cavity.

20. The blade holder of claim 18, wherein the main body comprises a magnet disposed underneath each of the at least one storage cavity.

21. The saw of claim 1, further comprising:
    a motor connected to the oscillating mechanism; and
    a blade holder disposed around the motor for magnetically holding a second blade.

22. The saw of claim 21, wherein the blade holder has at least one storage cavity.

23. The saw of claim 1, further comprising:
    a motor connected to the oscillating mechanism; and
    first and second potentiometers connected to the motor for controlling the motor speed.

24. The saw of claim 23, wherein the first and second potentiometers are connected in parallel to each other.

25. The saw of claim 23, wherein the second potentiometer is removably connected to the motor.

* * * * *